(12) United States Patent
Sung et al.

(10) Patent No.: US 7,783,083 B2
(45) Date of Patent: Aug. 24, 2010

(54) APPARATUS AND METHOD FOR DETECTING OCCLUDED FACE AND APPARATUS AND METHOD FOR DISCRIMINATING ILLEGAL USER USING THE SAME

(75) Inventors: Younghun Sung, Suwon-si (KR); Chanmin Park, Seongnam-si (KR); Euihyeon Hwang, Goyang-si (KR); Jongha Lee, Hwaseong-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 1238 days.

(21) Appl. No.: 11/248,271

(22) Filed: Oct. 13, 2005

(65) Prior Publication Data
US 2006/0291001 A1    Dec. 28, 2006

(30) Foreign Application Priority Data
Jun. 18, 2005    (KR) .................. 10-2005-0052762

(51) Int. Cl.
H04N 1/387    (2006.01)
(52) U.S. Cl. .................. 382/118; 382/294; 358/448; 358/453
(58) Field of Classification Search .............. 382/118, 382/294; 358/448, 453
See application file for complete search history.

(56) References Cited

U.S. PATENT DOCUMENTS

| 6,188,777 B1 * | 2/2001 | Darrell et al. ............. 382/103 |
| 7,321,670 B2 * | 1/2008 | Yoon et al. ................ 382/118 |
| 2005/0084140 A1 * | 4/2005 | Kakadiaris et al. ........ 382/118 |

FOREIGN PATENT DOCUMENTS

| KR | 1998-082154 | 11/1998 |
| KR | 2000-006110 | 10/2000 |

* cited by examiner

*Primary Examiner*—Bhavesh M Mehta
*Assistant Examiner*—Stephen R Koziol
(74) *Attorney, Agent, or Firm*—Staas & Halsey LLP

(57) ABSTRACT

Provided are an apparatus and method for detecting an occluded face and an apparatus and method for discriminating an illegal user using the same. The apparatus for detecting an occluded face includes a smoothing unit, a region division unit, a first region detection unit, a second region detection unit, and a decision unit. The smoothing unit smoothes a facial region. The region division unit divides the smoothed facial region into a first region and a second region. The first region detection unit generates a first region detection result by detecting whether the first region is an occluded region. The second region detection unit generates a second region detection result by detecting whether the first region is an occluded region. The decision unit decides whether the facial region is an occluded face based on the first region detection result and the second region detection result.

10 Claims, 9 Drawing Sheets

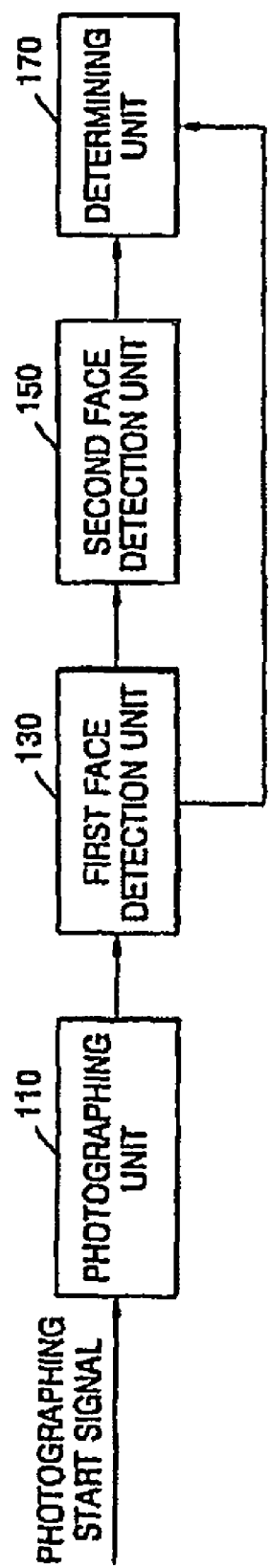
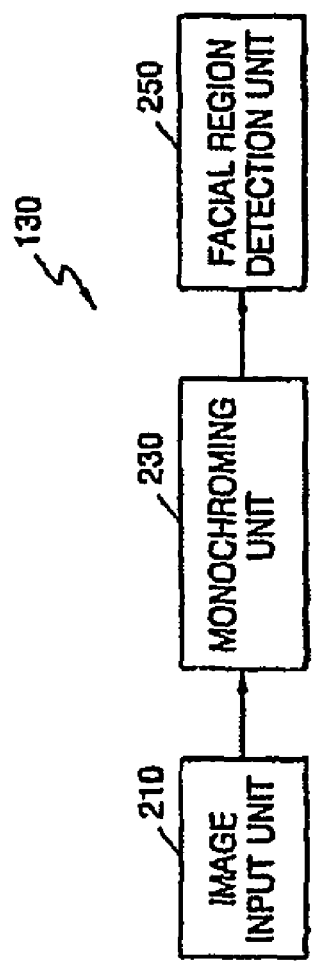

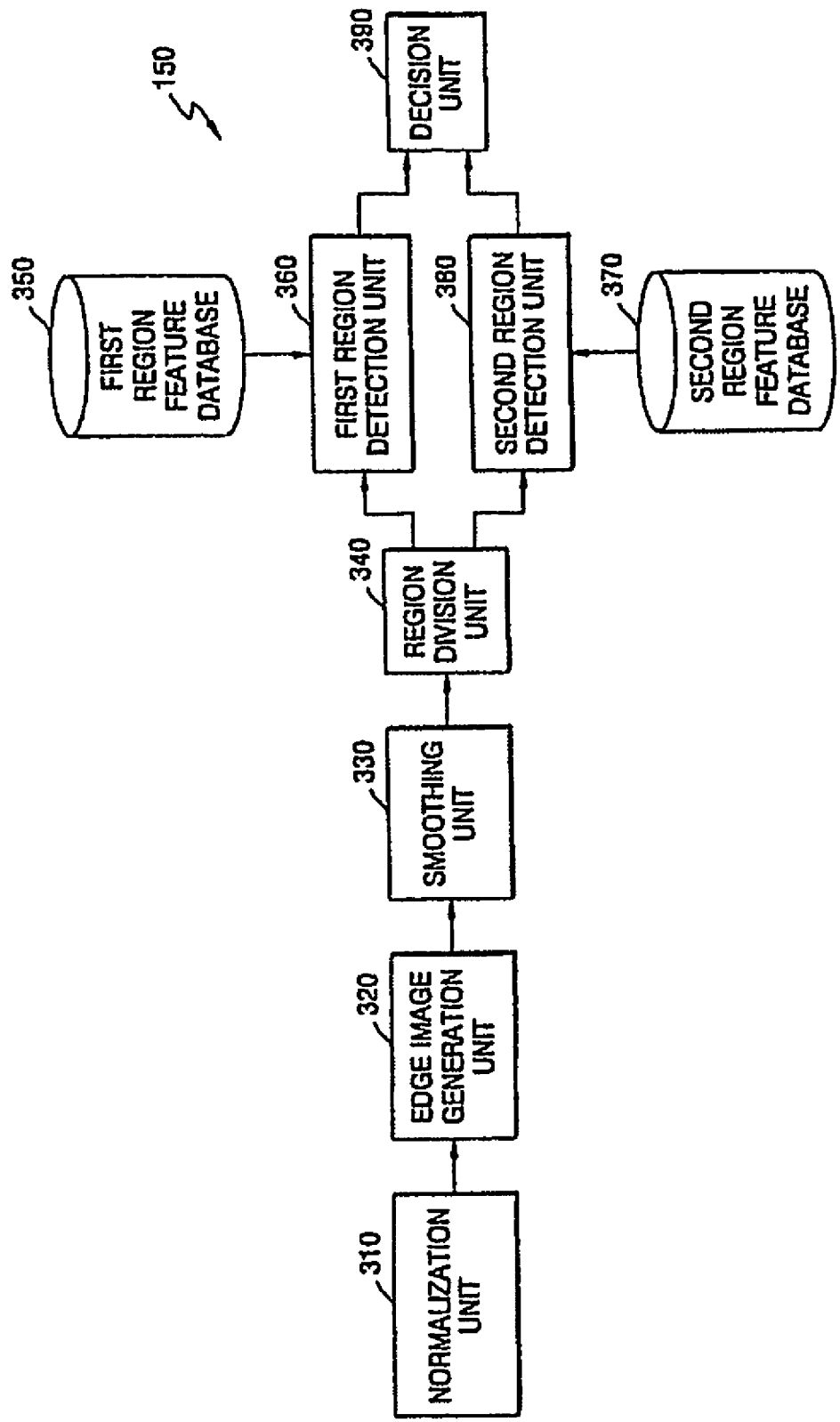

FIG. 4

| -100 | -100 | 0 | 100 | 100 |
|---|---|---|---|---|
| -100 | -100 | 0 | 100 | 100 |
| -100 | -100 | 0 | 100 | 100 |
| -100 | -100 | 0 | 100 | 100 |
| -100 | -100 | 0 | 100 | 100 |

| -100 | 32 | 100 | 100 | 100 |
|---|---|---|---|---|
| -100 | -78 | 92 | 100 | 100 |
| -100 | -100 | 0 | 100 | 100 |
| -100 | -100 | -92 | 78 | 100 |
| -100 | -100 | -100 | -32 | 100 |

| 100 | 100 | 100 | 100 | 100 |
|---|---|---|---|---|
| -32 | 78 | 100 | 100 | 100 |
| -100 | -100 | 0 | 92 | 100 |
| -100 | -100 | -100 | -78 | 32 |
| -100 | -100 | -100 | -100 | -100 |

| 100 | 100 | 100 | 100 | 100 |
|---|---|---|---|---|
| 100 | 100 | 100 | 100 | 100 |
| 0 | 0 | 0 | 0 | 0 |
| -100 | -100 | -100 | -100 | -100 |
| -100 | -100 | -100 | -100 | -100 |

| 100 | 100 | 100 | 100 | 100 |
|---|---|---|---|---|
| 100 | 100 | 100 | 78 | -32 |
| 100 | 92 | 0 | -92 | -100 |
| 32 | -78 | -100 | -100 | -100 |
| -100 | -100 | -100 | -100 | -100 |

| 100 | 100 | 100 | 32 | -100 |
|---|---|---|---|---|
| 100 | 100 | 92 | -78 | -100 |
| 100 | 100 | 0 | -100 | -100 |
| 100 | 78 | -92 | -100 | -100 |
| 100 | -32 | -100 | -100 | -100 |

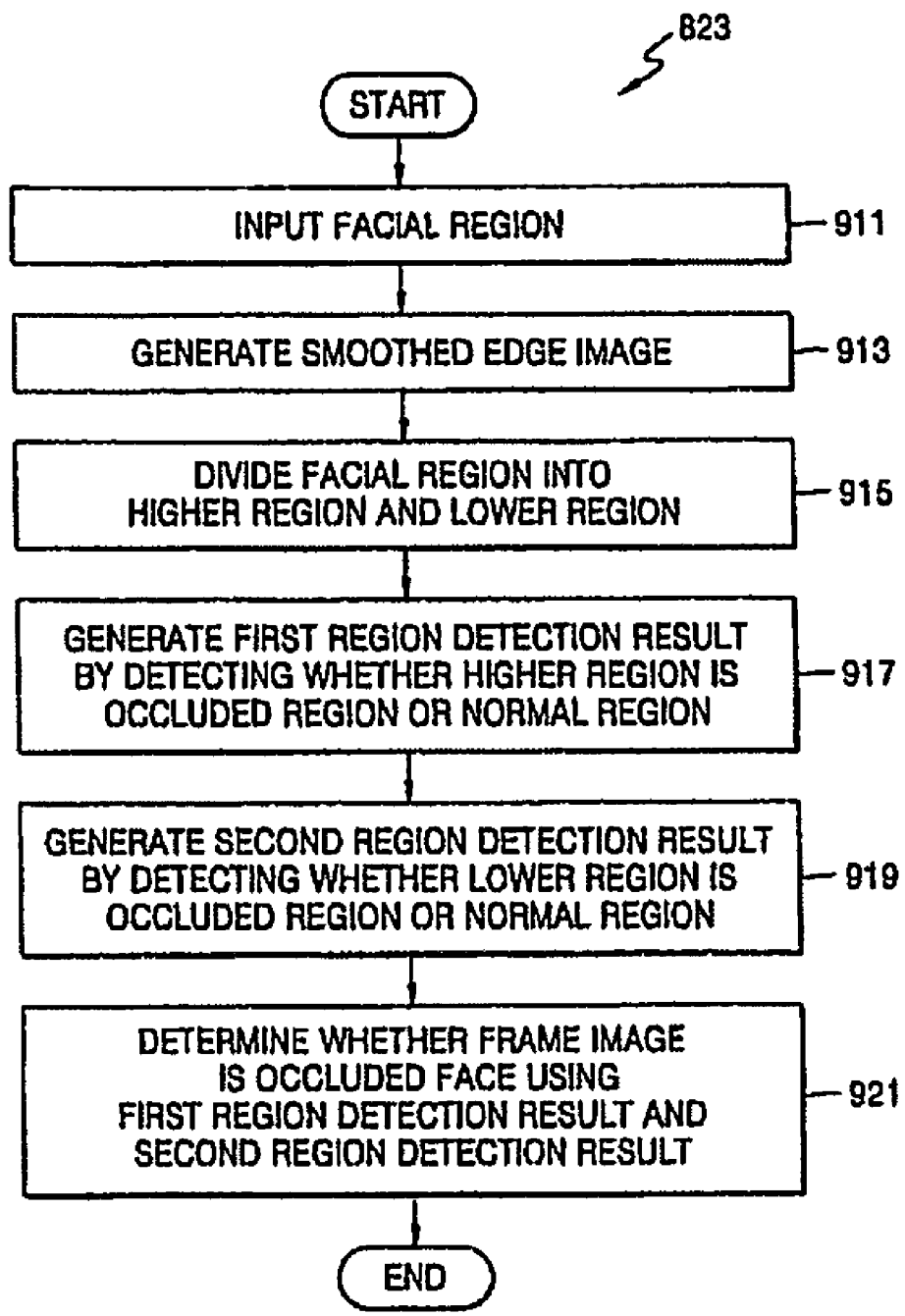

APPARATUS AND METHOD FOR DETECTING OCCLUDED FACE AND APPARATUS AND METHOD FOR DISCRIMINATING ILLEGAL USER USING THE SAME

CROSS-REFERENCE TO RELATED APPLICATIONS

This application claims the benefit of Korean Patent Application No. 10-2005-0052762, filed on Jun. 18, 2005, in the Korean Intellectual Property Office, the disclosure of which is incorporated herein in its entirety by reference.

BACKGROUND OF THE INVENTION

1. Field of the Invention

The present invention relates to an automatic teller machine (ATM) and, more particularly, to an apparatus and method for detecting an occluded face and an apparatus and method for discriminating an illegal user using the same, for an ATM.

2. Description of the Related Art

With recent developments in automation technology, cash dispensers or automatic teller machines (ATMs) have been used in a rapidly growing number of financial institutions. At the same time, there has been an increase in financial crimes in which cash or a check is illegally withdrawn using another person's credit card or passbook and personal identification number. To deter these financial crimes, financial institutions photograph and record transactions of all users with a camera mounted in an ATM and identify the face of an illegal user using a recording medium having the transactions recorded thereon. However, since illegal users usually commit financial crimes while preventing their faces from being photographed, it is difficult to accurately identify the faces of the illegal users using common photographing methods.

Korean Patent Publication Nos. 1998-82154 and 2000-61100 disclose techniques for controlling a user's access to service equipment connected to a monitoring system. According to Korean Patent Publication No. 1998-82154, a user's facial image is obtained from a monitoring camera for recording users' facial images in response to the operation of an ATM, it is checked whether confirmable feature points exist through an analysis of the obtained image, and a user's request is processed only when the presence of the feature points is confirmed. According to Korean Patent Publication No. 2000-61100, it is determined if images of the eyes and the mouth are accurately detected in a photographed facial image of a user and the operation of an ATM is stopped to prevent cash or a check from being withdrawn if the images of the eyes and the mouth are not accurately detected, thereby preventing financial crimes from occurring. In this situation, the images of the eyes and the mouth are not accurately detected when a user blocks a portion of the face with a hand, the face is inclined at an extreme angle, the user puts a cap across the face, the user wears a mask, or the user wears sunglasses that are very dark and are much larger than the sizes of the eyes.

However, in the techniques enclosed in the above-mentioned patent publications, when a user wears sunglasses or it is determined that occlusion occurs in an eye region due to the generation of a dark portion caused by shadows around the eyes, the sunglasses or the dark portion are recognized as normal eyes which happen to be larger than the user's actual eyes. Consequently, it is difficult to detect feature points of eyes. Moreover, since, unlike eyes, definitions of feature points of a nose and a mouth are insufficiently specific and a nose region and a mouth region are sensitive to illumination, the feature points of a nose and a mouth significantly change from case to case.

SUMMARY OF THE INVENTION

Additional aspects and/or advantages of the invention will be set forth in part in the description which follows and, in part, will be apparent from the description, or may be learned by practice of the invention.

The present invention provides an apparatus and method for detecting an occluded face of a user using an ATM.

The present invention also provides an apparatus and method for discriminating an illegal user based on facial images of users using an ATM.

According to an aspect of the present invention, there is provided an apparatus for detecting an occluded face. The apparatus includes a smoothing unit, a region division unit, a first region detection unit, a second region detection unit, and a decision unit. The smoothing unit smoothes a facial region. The region division unit divides the smoothed facial region into a first region and a second region. The first region detection unit generates a first region detection result by detecting whether the first region is an occluded region. The second region detection unit generates a second region detection result by detecting whether the second region is an occluded region. The decision unit decides whether the facial region is an occluded face based on the first region detection result and the second region detection result.

According to another aspect of the present invention, there is provided a method for detecting an occluded face. The method includes smoothing a facial region, dividing the smoothed facial region into a first region and a second region, generating a first region detection result by detecting whether the first region is an occluded region, generating a second region detection result by detecting whether the second region is an occluded region, and deciding whether the facial region is an occluded face based on the first region detection result and the second region detection result.

According to still another aspect of the present invention, there is provided an apparatus for discriminating an illegal user. The apparatus includes a photographing unit, a first face detection unit, a second face detection unit, and a determining unit. The photographing unit photographs an image of a current user in response to a photographing start signal. The first face detection unit detects a facial region from the photographed image. The second face detection unit smoothes the detected facial region and detects whether the smoothed facial region is an occluded face or a normal face. The determining unit determines whether the current user is a normal user or an illegal user based on a number of frames detected as an occluded face and the number of frames detected as a normal face.

According to yet another aspect of the present invention, there is provided a method for discriminating an illegal user. The method includes photographing an image of a current user in response to a photographing start signal, detecting a facial region from the photographed image, smoothing the detected facial region and detecting whether the smoothed facial region is an occluded face or a normal face, and determining whether the current user is a normal user or an illegal user based on a number of frames detected as an occluded face and the number of frames detected as a normal face.

The method for detecting an occluded face and the method for discriminating an illegal user may be implemented with computer-readable recording media having recorded thereon programs for implementing the methods.

BRIEF DESCRIPTION OF THE DRAWINGS

The above and other features and advantages of the present invention will become more apparent by describing in detail exemplary embodiments thereof with reference to the attached drawings in which:

FIG. 1 is a block diagram of an apparatus for discriminating an illegal user for an ATM according to an embodiment of the present invention;

FIG. 2 is a detailed block diagram of a first face detection unit shown in FIG. 1;

FIG. 3 is a detailed block diagram of a second face detection unit shown in FIG. 1;

FIG. 4 illustrates examples of gradient operators used in an edge image generation unit shown in FIG. 3;

FIG. 9 is a flowchart illustrating in detail an operation of detecting an occluded face in FIG. 8A.

DETAILED DESCRIPTION OF THE PREFERRED EMBODIMENTS

Figure 5:
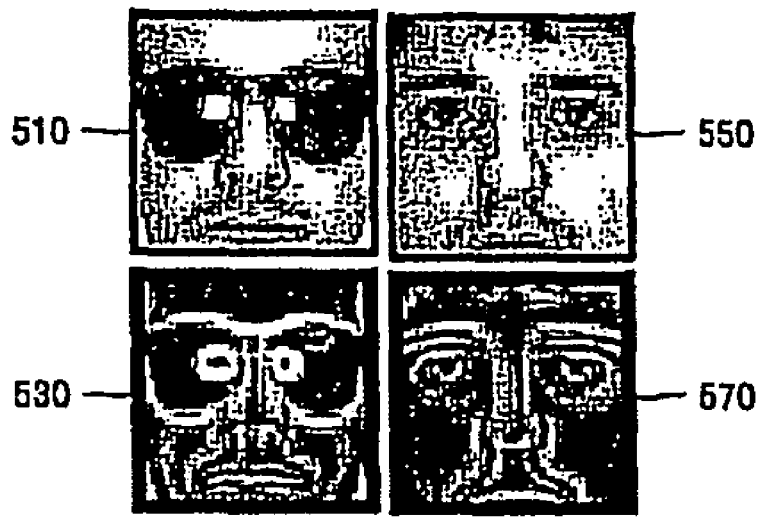
FIG. 5 illustrates general images and edge images thereof.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram of an apparatus for discriminating an illegal user for an ATM according to an embodiment of the present invention. The apparatus includes a photographing unit 110, a first face detection unit 130, a second face detection unit 150, and a determining unit 170.

Referring to FIG. 1, the photographing unit 110 may be implemented by a video camera and photographs an image of a user upon generation of a photographing start signal. The photographing start signal is generated when an event such as the insertion of a card or a passbook is recognized.

The first face detection unit 130 detects a facial region from the image provided from the photographing unit 110. The facial region is detected in each of a plurality of frame images. The number of the frame images is equal to a predetermined first threshold and the frame images are obtained during a predetermined unit time after the generation of the photographing start signal.

The second face detection unit 150 determines if a facial region detected by the first face detection unit 130 is an occluded face or a normal face.

The determining unit 170 determines whether a current user is a normal user or an illegal user by comparing the number of abnormal frame images detected as an occluded face by the second face detection unit 150 to a predetermined second threshold or by comparing the number of normal frame images detected as a normal face by the second face detection unit 150 to a predetermined third threshold. In other words, when the number of abnormal frame images is greater than the second threshold, or when the number of abnormal frame images is less than or equal to the second threshold and the number of normal frame images is less than the third threshold, the determining unit 170 determines the current user to be an illegal user. When the number of abnormal frame images is less than or equal to the second threshold and the number of normal frame images is equal to or greater than the third threshold, the determining unit 170 determines the current user to be a normal user.

According to another embodiment of the present invention, the determining unit 170 may compare the number of frame images in which a facial region is not detected when detecting a facial region from the frame images to a predetermined fourth threshold and determine a current user to be an illegal user if the number of frame images in which a facial region is not detected is greater than the fourth threshold, without detecting an occluded face with the second face detection unit 150. Since it is possible to promptly determine whether the current user is an illegal user, an illicit transaction can be prevented from occurring by stopping a transaction in an ATM or generating an alarm.

The first through fourth thresholds may be are statistically obtained as optimal values through experiments or simulation.

FIG. 2 is a detailed block diagram of the first face detection unit 130 shown in FIG. 1. The first face detection unit 130 includes an image input unit 210, a monochroming unit 230, and a facial region detection unit 250.

Referring to FIG. 2, a color image of a user obtained from the photographing unit 110 is input to the image input unit 210.

When the input image is a color image, the monochroming unit 230 converts the color image into a monochrome image. This is done because color and brightness components are mixed together in a color image configured in an RGB (Red, Green, Blue) mode and errors due to brightness changes may be generated upon the extraction of feature points.

The facial region detection unit 250 detects the facial region from the monochrome image provided from the monochroming unit 230. At this time, the facial region may be conventionally detected using a Gabor filter. In other words, sets of Gabor filters having various directionalities and frequencies are used and the facial region is detected according to response values of the Gabor filters. The facial region detection unit 250 detects a facial region from each frame image input during a predetermined period of time. Here, the predetermined period of time is, but is not limited to, an average time from when a user inserts a card or a passbook into an ATM to when the user withdraws cash or a check. When a facial region is detected in a frame image by the facial region detection unit 250, the facial region detected in the frame image is provided to the second face detection unit 150 and then a facial region is detected from a subsequent frame image. When a facial region is not detected in a frame image by the facial region detection unit 250, the frame image is discarded and then a facial region is detected from a subsequent frame image.

According to another embodiment of the present invention, the facial region detection unit 250 counts the number of frame images in which a facial region is not detected during a predetermined period of time. If the counted number of frame images is greater than the fourth threshold, the facial region detection unit 250 outputs a signal indicating that the counted number of frame images is greater than the fourth threshold to the determining unit 170.

FIG. 3 is a detailed block diagram of the second face detection unit 150 shown in FIG. 1. The second face detection unit 150 includes a normalization unit 310, an edge image generation unit 320, a smoothing unit 330, a region division unit 340, a first region feature database 350, a first region detection unit 360, a second region feature database 370, a second region detection unit 380, and a decision unit 390.

Referring to FIG. 3, the normalization unit 310 performs conventional corrections for the size, inclination and the like of the facial image to normalize the facial region. For example, the facial region may be normalized to a size of 60×60 pixels. According to another embodiment of the present invention, the normalization unit 310 may be positioned after the smoothing unit 330.

The edge image generation unit 320 generates an edge image of the facial region provided from the normalization unit 310. In terms of image processing, it is known that edge features are robuster than pixel values to illuminate changes. Thus, an edge image is robuster than a general image illuminating changes.

To generate an edge image, an edge may be extracted using well-known methods or modifications thereto.

In general, an edge image g(x, y) with respect to a point I(x, y) in a facial region can be given by $$g(x,y)=\sqrt{g_1^2(x,y)+g_2^2(x,y)} \quad (1),$$

where $g_1^2(x, y)$ represents a change along the direction of an x-axis and $g_2^2(x, y)$ represents a change along the direction of a y-axis. In a method defined by Equation 1, an edge size is obtained using a mask with respect to two directions, i.e., x and y directions. This is disclosed in detail in various documents such as "Object Enhancement and Extraction" by J. M. S. Prewitt (Picture Processing and Psychopictorics, New York, Academic press, 1970), "A survey of edge detection techniques" by L. S. Davis (Computer Graphics and Image Processing, vol. 4, pp. 248-270, 1975), and "Machine perception of three-dimensional solids" by L. G. Roberts (Computer Methods in Image Analysis, Los Angeles, IEEE Computer Society, 1977).

When edge sizes are obtained for i directions, where i is greater than two, and an edge image g(x, y) with respect to a point I(x, y) is formed using a direction having the largest edge size, the edge image g(x,y) can be given by $$g(x,y)=\max|g_i(x,y)| \quad (2)$$

This is disclosed in detail in "Fast boundary detection: a generalization and a new algorithm" by W. Frei and C. C. Chen (IEEE Trans. Computer 26, No. 2, October, 1977).

In the present embodiment, an edge image is extracted by modifying a method defined by Equation (2). For example, 360° is divided into twelve 30° regions and edge sizes are obtained for 12 directions. FIG. 4 illustrates examples of 6 gradient operators among 12 gradient operators where the not shown gradient operators are mirror images.

FIG. 5 illustrates a general image 510 of a user wearing sunglasses, an edge image 530 of the general image 510, a normal general image 550, and an edge image 570 of the normal general image 550.

The smoothing unit 330 smoothes an edge image provided from the edge image generation unit 320 by expressing the edge image in a scale space using a Gaussian kernel. Since abstraction is performed on an edge image by reducing minute features of the edge image, the edge image has a continuous appearance.

When using a one-dimensional signal, the Gaussian scale space is defined as follows.

$$L(x;t) = \int_{\xi=-\infty}^{\xi=\infty} g(\xi;t)f(x-\xi)d\xi \quad (3)$$

$$g(x;t) = \frac{1}{\sqrt{s\pi t}}e^{-x^2/2t},$$

where L(x;t) is an image smoothed by being expressed in the scale space, g(ξ;t) is the Gaussian kernel, and f(x−ξ) is an edge image. This is disclosed in detail in "Scale-space theory in computer vision" by T. Lindeberg (Kluwer Academic Publishers, 1994).

Figure 6A:
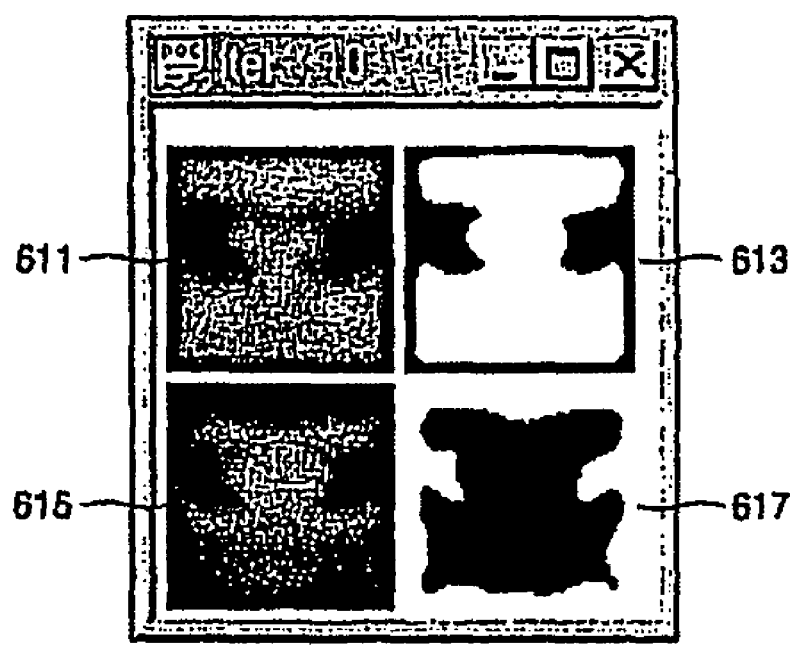
FIGS. 6A through 6C are views for explaining changes in images according to illumination.
Figure 6B:
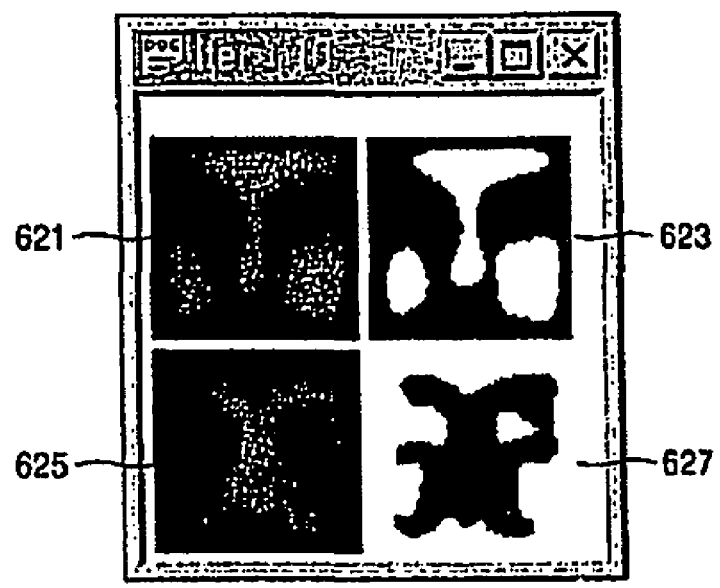
Figure 6C:
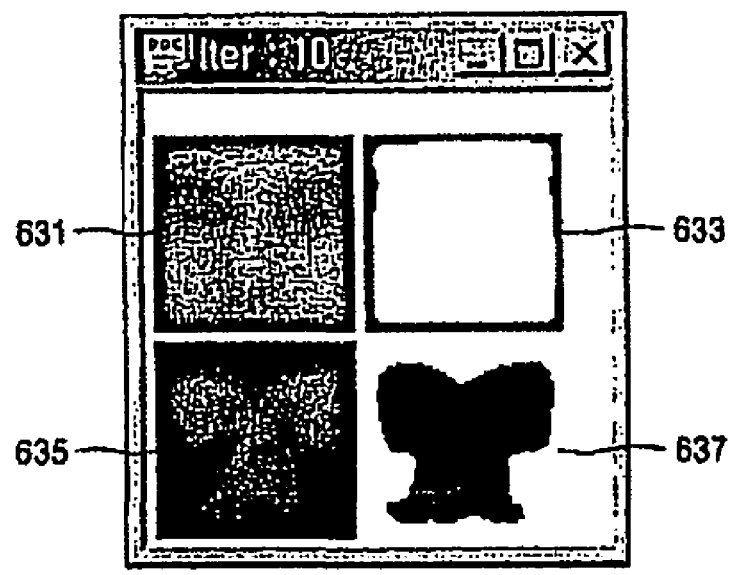

FIGS. 6A through 6C are views for explaining changes in edge images and smoothed images according to illumination. FIG. 6A involves an image of a user wearing sunglasses, in which a smoothed image 611, a binarized image 613 of the smoothed image 611, a smoothed edge image 615, and a binarized image 617 of the smoothed edge image 615 are shown. FIG. 6B involves an image of a user that is photographed under backlighting, in which a smoothed image 621, a binarized image 623 of the smoothed image 621, a smoothed edge image 625, and a binarized image of the smoothed edge image 625 are shown. FIG. 6C involves a normal general image in which a smoothed image 631, a binarized image 633 of the smoothed image 631, a smoothed edge image 635, and a binarized image 637 of the smoothed edge image 635 are shown.

Referring to FIGS. 6A and 6B, both the binarized image 613 of an image of a user wearing sunglasses and the binarized image 623 of an image of a normal user photographed under backlighting, which are not smoothed, are detected as occluded faces, but they can be clearly distinguished if they are smoothed or edge images thereof are generated and smoothed.

Figure 7:
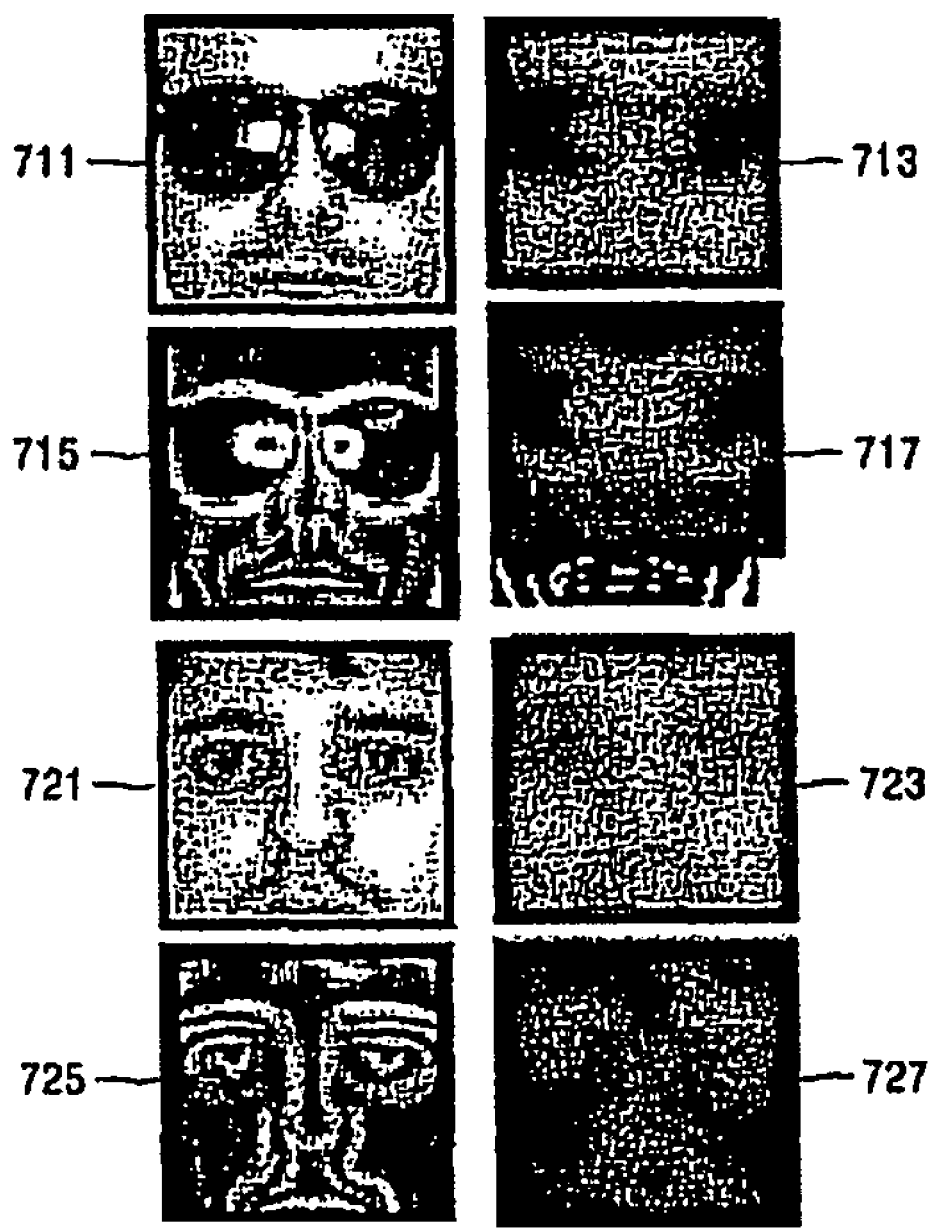
FIG. 7 illustrates general images and edge images expressed in a scale space.

FIG. 7 illustrates general images and edge images expressed in a scale space. More specifically, in FIG. 7, a general image 711 of a user wearing sunglasses, a smoothed image 713 of the general image 711, an edge image 715 of the general image 711, and a smoothed image 717 of the edge image 715 are shown. In addition, a normal general image 721, a smoothed image 723 of the normal general image 721, an edge image 725 of the normal general image 721, and a smoothed image 727 of the edge image 725 are shown.

According to another embodiment of the present invention, an image may be directly smoothed by the smoothing unit 330 without passing through the edge image generation unit 320. However, when an image passes through the edge image generation unit 320 and the smoothing unit 330, it becomes very robust to illuminating changes.

The region division unit 340 divides a facial region that is smoothed by the smoothing unit 330 into a higher or upper region centered on eyes and a lower region centered on a mouth. For example, when the facial region is normalized into an image of 60×60 pixels, the higher region may have a size of 60×25 pixels and the lower region may have a size of 60×35 pixels. By dividing the facial region into the higher region and the lower region, the size of a search region is limited in during extraction of feature vectors from facial components, thereby avoiding a local minimum and allowing the accurate and rapid extraction of the feature vectors.

The first region feature database 350 stores feature vectors belonging to a normal facial image class and feature vectors belonging to an occluded facial image class with regard to a higher or upper region. The feature vectors are conventionally obtained by training using higher regions obtained from a plurality of training images.

The second region feature database 370 stores feature vectors belonging to a normal facial image class and feature vectors belonging to an occluded facial image class with regard to a lower region. The feature vectors are conventionally obtained by training using lower regions obtained from a plurality of training images. The normal facial image class includes facial images in which higher regions or lower regions are identifiable, and the occluded facial image class includes facial images in which higher regions or lower regions are unidentifiable because the faces are partially occluded by sunglasses, masks, or scarves. During a training process, a conventional support vector machine (SVM) algorithm can be used, though the present invention is not limited thereto.

The first region detection unit 360 detects whether a portion of the face corresponding to the higher region provided from the smoothing unit 330 is occluded by referring to the feature vectors belonging to the normal facial image class and the occluded facial image class stored in the first region feature database 350. To detect an occluded region, the higher region is conventionally projected onto a higher region principal component analysis (PCA) space and feature vectors are obtained by reducing the dimension of the higher region PCA space. It is conventionally determined whether the obtained feature vectors belong to the occluded facial image class or the normal facial image class using an SVM classifier. The first region detection unit 360 provides a result indicating whether an occluded region is detected, i.e., a first region detection result, to the decision unit 390.

The second region detection unit 380 detects whether a portion of the face corresponding to the lower region provided from the smoothing unit 330 is occluded by referring to the feature vectors belonging to the normal facial image class and the occluded facial image class stored in the second region feature database 370. Like the first region detection unit 360, to detect an occluded region, the lower region is projected onto a lower region PCA space and feature vectors are obtained by reducing the dimension of the lower region PCA space. It is determined whether the obtained feature vectors belong to the occluded facial image class or the normal facial image class using an SVM classifier. The second region detection unit 380 provides a result indicating whether an occluded region is detected, i.e., a second region detection result, to the decision unit 390.

The decision unit 390 decides whether a frame image is an occluded face using the first region detection result from the first region detection unit 360 and the second region detection result from the second region detection unit 380. In other words, when at least one of the first region detection result and the second region detection result indicates that a corresponding portion is occluded, the decision unit 390 decides that the frame image is an occluded face.

Figure 8A:
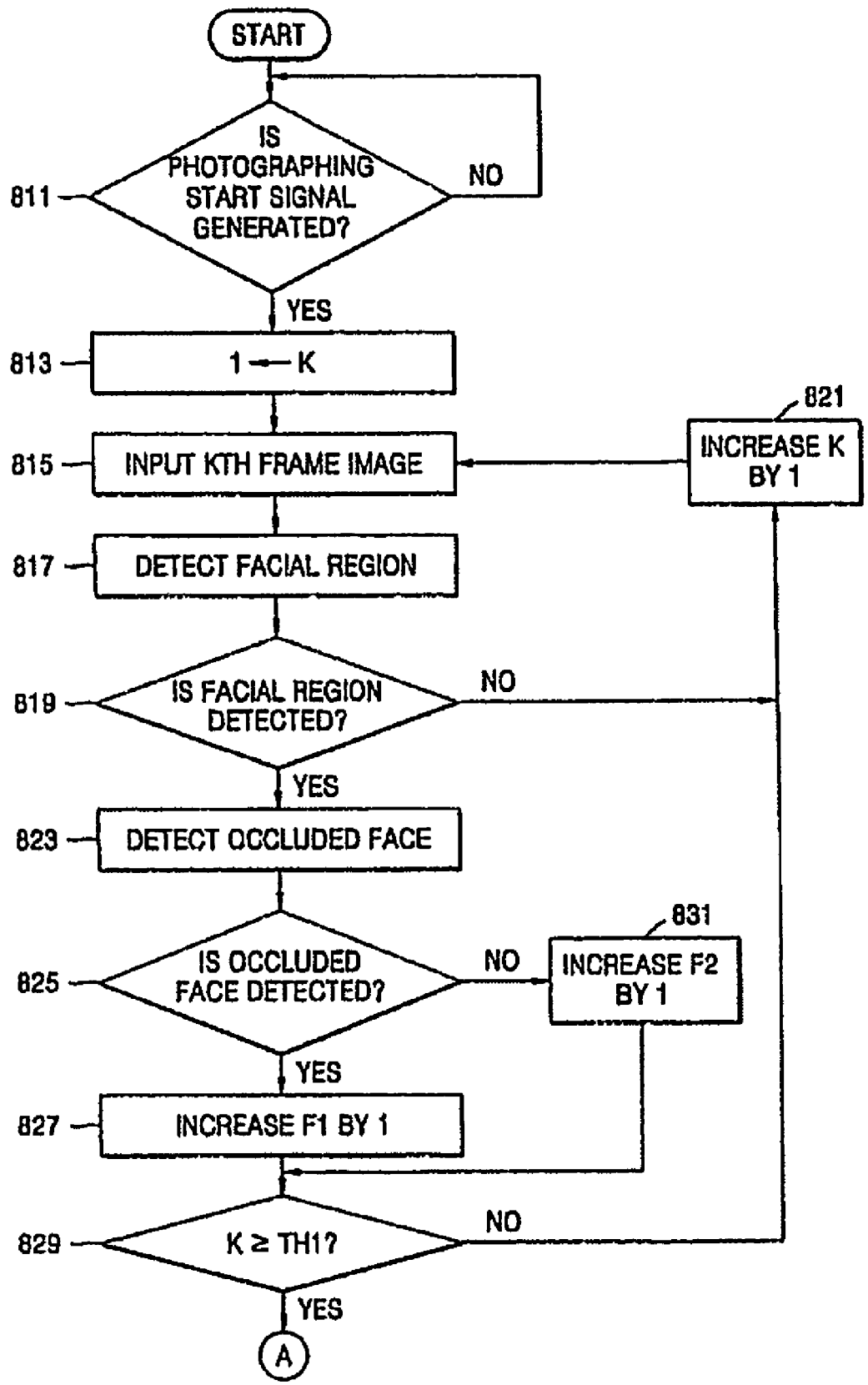
FIGS. 8A and 8B are flowcharts illustrating a method for discriminating an illegal user for an ATM according to an embodiment of the present invention.
Figure 8B:
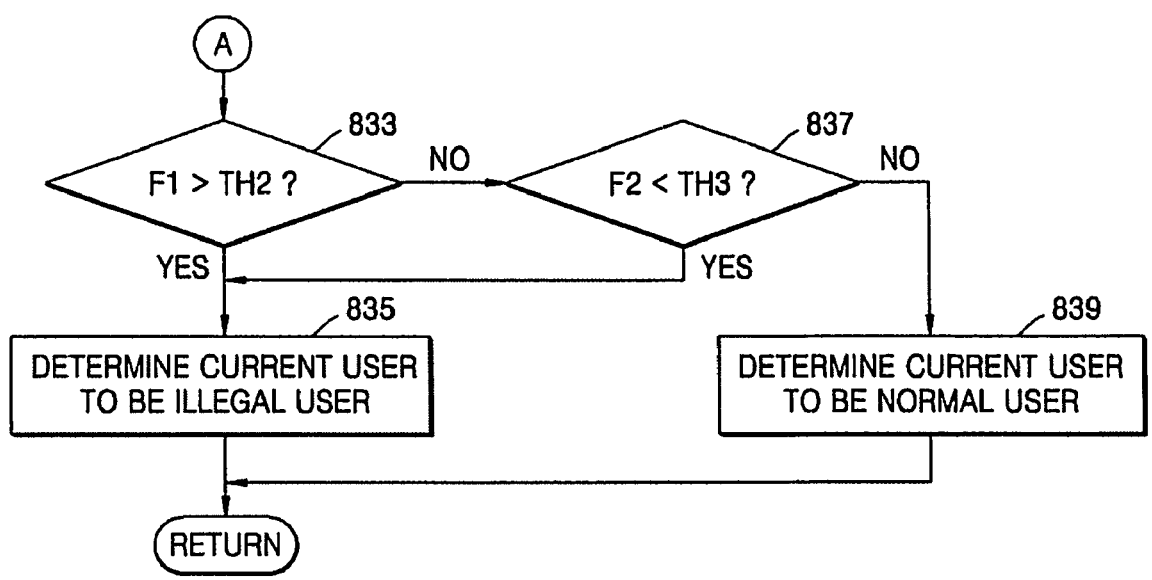

FIGS. 8A and 8B are flowcharts illustrating a method for discriminating an illegal user for an ATM according to an embodiment of the present invention.

Referring to FIGS. 8A and 8B, it is determined whether a photographing start signal is generated in operation 811. When the photographing start signal is generated in operation 811, the number of frames to be photographed and input for a current user, K, is initialized to 1 in operation 813. In operation 815, a $k^{th}$ frame image of the current user is input.

In operation 817, a facial region is detected from the $k^{th}$ frame image. In operation 819, it is determined whether a facial region is detected. If it is determined that a facial region is not detected in operation 819, K is increased by 1 in operation 821 and the process returns to operation 815 to count the number of frames in which a facial region is not detected.

If it is determined that a facial region is detected in operation 819, an occluded face is detected from the detected facial region in operation 823 (see FIG. 9). In operation 825, it is determined whether an occluded face is detected. If it is determined that an occluded face is detected in operation 825, the number of abnormal frames, F1, is increased by 1 in operation 827. The number of input frames is compared to a first threshold, TH1, in operation 829, and if the number of input frames is equal to or greater than TH1, the process goes to operation 833. If the number of input frames is less than TH1, the process returns to operation 821. If it is determined that an occluded face is not detected in operation 825, the number of normal frames, F2, is increased by 1 in operation 831.

When the number of input frames is equal to or greater than TH1 (FIG. 8B), F1 is compared to a second threshold, TH2, in operation 833. If F1 is greater than TH2, it is determined that the current user is an illegal user (or has an unacceptable face) in operation 835. If F1 is less than or equal to TH2, the process goes to operation 837.

If F1 is less than or equal to TH2, F2 is compared to a third threshold, TH3, in operation 837. If F2 is less than TH3, it is determined that the current user is an illegal user in operation 835. If F2 is equal to or greater than TH3, it is determined that the current user is a normal user or has an acceptable face in operation 839.

Although not shown in FIGS. 8A and 8B, the number of frames in which no facial region is detected in operation 819 may be compared to a fourth threshold, TH4. If the number of frames in which no facial region is detected is greater than TH4, operations 823 through 841 may be skipped and it may be decided that the current user is an illegal user or an unacceptable face has been captured.

FIG. 9 is a flowchart illustrating in detail operation 823 in which an occluded face is detected in FIG. 8A.

Referring to FIG. 9, a facial region detected by the first face detection unit 130 is input in operation 911.

In operation 913, an edge image of the facial region input in operation 911 is smoothed. According to another embodiment of the present invention, the entire facial region input in operation 911 may be smoothed. In addition, a process of normalizing the size of the facial region may be added before or after operation 913.

In operation 915, the facial region smoothed in operation 913 is divided into a higher or upper region and a lower region.

In operation 917, a first region detection result is generated by detecting whether the higher region is an occluded region or a normal region. In operation 919, a second region detection result is generated by detecting whether the lower region is an occluded region or a normal region. The order in which operations 917 and 919 are performed may be changed, or operations 917 and 919 may be performed at the same time.

In operation 921, it is determined whether a frame image is an occluded face using the first region detection result and the second region detection result. In other words, if at least one of the first region detection result and the second region detection result indicates that a portion is an occluded region, it is determined that the frame image is an occluded face.

To evaluate the performance of the occluded face detection algorithm according to an embodiment of the present invention, experiments were carried out using a first database and a second database. The first database was an AR database (created by by Aleix Martinez and Robert Benavente of the Computer Vision Center of U.A.B.) provided from Purdue University and the second database was a database obtained from an actual ATM environment where illumination changes occur. For performance evaluation, a first measure and a second measure were determined. Here, the first measure is a detection rate and the second measure is a false alarm rate. The detection rate represents a ratio of the number of images that are actually detected as an occluded face to the total number of images of occluded faces. The false alarm rate represents a ratio of the number of images that are mistakenly detected as an occluded face to the total number of images of a normal face.

First, an experiment using the first database was conducted as follows. Since the first database includes facial images obtained in an indoor constrained environment where illumination is adjusted and a pose is fixed, it may be used to evaluate the validity and performance of a corresponding algorithm. Among facial images included in the first database, 1560 front facial images were used as training images. Among the 1560 front facial images, 1200 images were normal front facial images, 180 images were front facial images of users wearing sunglasses, and the remaining 180 images were front facial images of users wearing masks. To detect an occluded face, 100 eigen modes were used. Test images used for detection of an occluded face included not only the 1560 images used as training images but also 636 additional images from the first database. The results of detection of occluded faces with respect to the 1560 images and the 636 images are shown in Table 1 and Table 2.

TABLE 1

| | 1560 training images | |
|---|---|---|
| | Detection rate | False alarm rate |
| Higher region | 99.21% | 0.41% |
| Lower region | 99.41% | 0.12% |

TABLE 2

| | 636 added images | |
|---|---|---|
| | Detection rate | False alarm rate |
| Higher region | 97.28% | 1.20% |
| Lower region | 97.96% | 0.41% |

Referring to Table 1 and Table 2, both the detection rates and the false alarm rates reached acceptable values, and thus the validity and performance of the occluded face detection algorithm according to an embodiment of the present invention can be confirmed.

An experiment using the second database was conducted as follows. For the variety of face patterns, the facial images included in the first database were used as training images and test images. The second database included a total of 13 facial images that were occluded faces, including 11 facial images of users wearing sunglasses and 2 facial images of users wearing a mask. A total of 4819 facial images included in the first database and the second database were used as training images. Among the 4819 facial images, 1200 images were normal facial images, 3345 images were images of users wearing sunglasses, and 1129 images are images of users wearing masks. The results of detection of occluded faces with respect to the 4819 images that are used as training images and 1500 images that were not used as training images are as shown in Table 3 and Table 4.

TABLE 3

| | 4819 training images | |
|---|---|---|
| | Detection rate | False alarm rate |
| Higher region | 98.99% | 0.10% |
| Lower region | 98.56% | 0.44% |

TABLE 4

| | 1500 added images | |
|---|---|---|
| | Detection rate | False alarm rate |
| Higher region | 95.50% | 1.08% |
| Lower region | 96.20% | 2.76% |

Referring to Table 3 and Table 4, when the training images were used as test images, a detection rate of 98% or greater and a false alarm rate of 0.5% or less were obtained. When facial images other than training images were used as test images, a detection rate of 95% or greater and a false alarm rate of 3.0% or less were obtained. As can be seen from the foregoing results, the occluded face detection algorithm according to an embodiment the present invention is robust to changes in environment such as illumination or countenance expression when a facial image is obtained.

As described above, according to the present invention, an edge image of a photographed image is generated, the generated edge image is smoothed by being projected onto a scale space, and an occluded face is detected, thereby accurately and rapidly determining whether a current user blocks a portion of his/her face with sunglasses, a hat, a mask or a scarf, regardless of changes in the environment such as illumination or countenance expression.

In addition, it is possible to accurately determine whether the current user is a normal user or an illegal user using the result of determining whether the current user blocks a portion of his/her face. If the current user is an illegal user, an illicit transaction can be promptly handled through active control of access to an ATM.

The units of the present invention may be software included within a computer of the ATM. The present invention can also be embodied as computer-readable code on a computer-readable recording medium. The computer-readable recording medium is any data storage device that can store data which can be thereafter read by a computer system. Examples of computer-readable recording media include read-only memory (ROM), random-access memory (RAM), CD-ROMs, magnetic tapes, floppy disks, optical data storage devices, and carrier waves. The computer-readable recording medium can also be distributed over network of coupled computer systems so that the computer-readable code is stored and executed in a decentralized fashion. Functional programs, code, and code segments for implementing the present invention can be easily construed by those skilled in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for detecting an occluded face, the apparatus comprising:
    a smoothing unit to smooth a facial region of an image to obtain a facial region robust to illuminating changes;

a region division unit to divide the smoothed facial region into a first region and a second region;

a first region detection unit to generate a first region detection result by detecting whether the first region is an occluded region;

a second region detection unit to generate a second region detection result by detecting whether the second region is an occluded region;

a decision unit to decide whether the facial region is an occluded face based on the first region detection result and the second region detection result; and an edge image generation unit generating an edge image of the facial region and providing the edge image to the smoothing unit, wherein the edge image generation unit determines a direction having a largest edge size calculated using gradient operators with respect to a plurality of directions as an edge direction at an arbitrary point.

2. The apparatus of claim 1, further comprising a normalization unit normalizing a size of the facial region and providing a normalized facial region to the edge image generation unit.

3. The apparatus of claim 1, further comprising a normalization unit normalizing the smoothed facial region and providing a normalized facial region to the region division unit.

4. The apparatus of claim 1, wherein the smoothing unit uses a Gaussian kernel.

5. The apparatus of claim 1, wherein the first region is a higher region centered on eyes and the second region is a lower region centered on a mouth.

6. A method for detecting an occluded face, the method comprising:

smoothing, using a processor, a facial region of an image to obtain a facial region robust to illuminating changes;

dividing the smoothed facial region into a first region and a second region;

generating a first region detection result by detecting whether the first region is an occluded region;

generating a second region detection result by detecting whether the second region is an occluded region;

deciding whether the facial region is an occluded face based on the first region detection result and the second region detection result; and generating an edge image of the facial region and providing the edge image to the smoothing of the facial region, wherein the generating of the edge image comprises determining a direction having a largest edge size calculated using gradient operators with respect to a plurality of directions as an edge direction at an arbitrary point.

7. The method of claim 6, further comprising normalizing a size of the facial region before the generating of the edge image.

8. The method of claim 6, further comprising normalizing the smoothed facial region after the smoothing of the facial region and before the dividing of the smoothed facial region.

9. The method of claim 6, wherein the smoothing of the facial region is performed using a Gaussian kernel.

10. A non-transitory computer-readable recording medium having recorded thereon a program for implementing a method for detecting an occluded face, the method comprising:

generating an edge image of a facial region of an image;

smoothing the edge image to obtain an edge image robust to illuminating changes;

dividing the smoothed facial region into a first region and a second region;

generating a first region detection result and a second region detection result by detecting whether the first region is an occluded region and whether the second region is an occluded region; and deciding whether the facial region is an occluded face using the first region detection result and the second region detection result, wherein the generating of the edge image comprises determining a direction having a largest edge size calculated using gradient operators with respect to a plurality of directions as an edge direction at an arbitrary point.

* * * * *